United States Patent [19]

Kobayashi et al.

[11] Patent Number: 4,701,024
[45] Date of Patent: Oct. 20, 1987

[54] LIQUID CRYSTAL MATERIAL INCLUDING MAGNETIC PARTICLES AND METHOD OF PRODUCING THE SAME

[75] Inventors: Shunsuke Kobayashi; Yoshihiko Matsuyama; Masayoshi Koutake, all of Kawaguchi, Japan

[73] Assignee: Dai-ichi Seiko Kabushiki Kaisha, Kawaguchi, Japan

[21] Appl. No.: 936,180

[22] Filed: Dec. 1, 1986

[30] Foreign Application Priority Data

Dec. 2, 1985 [JP] Japan ................ 60-272166
Apr. 25, 1986 [JP] Japan ................ 61-97382

[51] Int. Cl.$^4$ ............................... G02F 1/13
[52] U.S. Cl. ................ 350/331 R; 350/340; 350/341; 350/350 R
[58] Field of Search .............. 350/331 R, 340, 341, 350/350 R

[56] References Cited

U.S. PATENT DOCUMENTS

| | | | |
|---|---|---|---|
| 4,060,910 | 12/1977 | Gell, Jr. ............... | 350/331 R X |
| 4,198,635 | 4/1980 | Gell, Jr. ............... | 350/331 R X |
| 4,305,807 | 12/1981 | Somlyody ............. | 350/331 R X |
| 4,435,047 | 3/1984 | Fergason ............. | 350/350 R X |

Primary Examiner—John K. Corbin
Assistant Examiner—Richard F. Gallivan
Attorney, Agent, or Firm—Spensley Horn Jubas & Lubitz

[57] ABSTRACT

In order to make it possible to be adapted to be used for an integrated liquid crystal panel having a built-in direct touch-entry enabling device, a liquid crystal material made by dispersing many needle-shaped magnetic substance particles respectively coated with a surface active agent in a well known liquid crystal substance and a method of making the same. The liquid material can be utilized in the form of many encapsulated liquid material units combined with one another. In case such encapsulated liquid crystal material is used for a liquid crystal device, it need not be sealed with glass or the like and can be directly applied to paint any required part and, even if the painted part is curved during the use, it can develop its performance.

12 Claims, 26 Drawing Figures

OFF ─────────────────────▶ ON

FIG. 10A    FIG. 10B    FIG. 10C

ON ──────────────────────▶ OFF

LIQUID CRYSTAL MATERIAL INCLUDING MAGNETIC PARTICLES AND METHOD OF PRODUCING THE SAME

BACKGROUND OF THE INVENTION (a) Field of the Invention

This invention relates to liquid crystal materials and methods of producing the same and more particularly to a magnetically sensitive liquid crystal material adapted to be used for an integrated liquid crystal panel having a built-in direct touch-entry enabling device and a method of producing the same.

(b) Description of the Prior Art

In a computer device or the like, it is very convenient to be able to put in a signal by directly touching the display section. There are already suggested such input devices of various systems. A liquid crystal display device with touch-entry is known as one of them. In such device, two transparent electroconductors are arranged on a display surface so that the electroconductive surfaces may be opposed to each other with some spacing between them and are made a matrix in the X and Y directions so that, when the electroconductors are touched, the electrode corresponding to the X and Y axes of the touched part will be on or piezoelectric elements are arranged on the periphery of the display surface and transparent bodies are arranged over the entire display surface so as to be able to press the piezoelectric elements. However, in such conventional devices, it is necessary to add such contact structure or piezoelectric structure for touch-entry in addition to the display structure and therefore there have been defects that the devices are comparatively high in the cost and are unstable in respect of the durability and reliability.

It is general in displaying with the conventional liquid crystal material that, for example, in case it is to be used for a display device, it is sealed in the form of a sandwich with such transparent bodies as of glass and its molecular orientation is varied by electric signals for transparent electrodes arranged along the glass surfaces so as to vary the reflectivity or transmittance of the light. Therefore, as a liquid crystal device, the structure is complicated and the entire form is specified by the form of the sealing glass. Thus, there have been problems in its application and handling.

Further, such conventional liquid crystal material is of an electric field effective type and can be utilized only for an electric display device but has not been able to be used for a magnetic field responding type device or a signal input device.

SUMMARY OF THE INVENTION

A primary object of the present invention is to provide a liquid crystal material adapted to be used for an integrated liquid crystal panel having a built-in direct touch-entry enabling device and a method of producing the same.

Another object of the present invention is to provide a magnetically sensitive liquid crystal material wherein the molecular orientation varies in response to the change of the magnetic field so that the displaying state can be magnetically varied or a signal can be put in with a magnet or the like.

Further, another object of the present invention is to provide a liquid crystal material which need not be sealed with glass or the like but can be directly applied to paint any required part in order to be used for a display device and can be curved in the using state.

Still, another object is to provide an integrated liquid crystal panel having a built-in direct touch-entry enabling device wherein a positive and precise touch-entry can be made, the durability and reliability are high and the production cost can be made low.

According to the present invention, the above-mentioned objects are attained by preparing a liquid crystal material in which many needle-shaped magnetic substance particles coated with a surface active agent are dispersed. According to the present invention, such liquid crystal material is produced by treating any magnetic substance particles on the surfaces with a surface active agent so that the long axes of liquid crystal molecules may be oriented to be vertical to the magnetic substance surfaces and that the magnetic substance particles may be uniformly dispersed in a liquid crystal without making the magnetic substance cohere, dispersing the thus obtained magnetic substance particles in a solvent affinable with the liquid crystal, mixing the particles together with the solvent into the liquid crystal and then volatilizing and removing the solvent.

According to a preferred formation of the present invention, the liquid crystal material is used in the form in which the liquid crystal material in which many needle-shaped magnetic substance particles coated with a surface active agent are dispersed in encapsulated and the thus obtained many microcapsules are combined. Therefore, even in case the liquid crystal material is used as a liquid crystal panel, it may be merely applied to paint any part to be used. The panel part can be curved while in use. As this liquid crystal material is magnetically sensitive, if a permanent magnet is brought adjacently to it, the direction of the needle-shaped magnetic substance will vary and the permeability will vary. Therefore, it can be utilized as an input device for a touch-entry type magnetic display device or magnetic sensor.

These and other objects as well as the features and advantages of the present invention will be apparent from the following detailed description of the preferred embodiments when taken in conjunction with the accompanying drawings.

DESCRIPTION OF THE PREFERRED EMBODIMENTS

Figure 1:
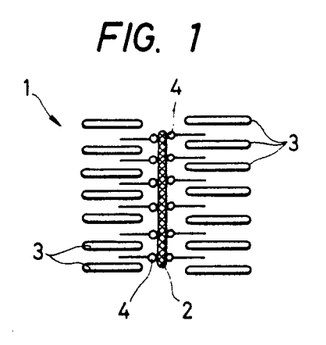
FIG. 1 is an explanatory view showing the formation of an embodiment of the liquid crystal material according to the present invention.

First of all, the method of producing the liquid crystal material according to the present invention shall be explained with reference to FIG. 1.

Needle-shaped ferrite or metal particles are used as magnetic substance particles. A monobasic carboxylic acid polynucleic chromium complex, dimethyloctadecylaminopropyltrimethoxyl chloride or organic silane compound is used as a surface active agent. Toluene, xylene, acetone or chloroform is used as a liquid crystal solvent. That is to say, to obtain a liquid crystal material 1, first of all, magnetic substance particles 2 are uniformly and stably dispersed in an ordinary liquid crystal, are treated on the surfaces with a surface active agent 4 to orient liquid crystal molecules 3 vertically to the surfaces of the magnetic substance particles 2, are dispersed in a solvent prepared in advance and are then mixed into a liquid crystal, then the solvent and liquid crystal are removed and the magnetic substance particles 2 are again mixed into the liquid crystal. In the thus obtained liquid crystal material, the liquid crystal molecules 3 are oriented vertically to the magnetic substance particles by the surface active agent 4 deposited on the surfaces of the magnetic substance particles. The length of the magnetic substance particles 2 is about 0.2 to 0.5μ and the length of the liquid crystal molecule is about 50 Å. Concrete examples shall be described in the following:

EXAMPLE 1

Magnetic substance particles (of ferrite or metal) were treated on the surfaces with a surface active agents (monobasic carboxylic acid polynucleic chromium complex, dimethyloctadecylaminopropyltrimethoxyl chloride (DMOAP), any surface active agent or any silane coupling agent) by which the long axes of liquid crystal molecules 3 could be oriented to be vertical to the magnetic substance particles 2 and the magnetic substance particles 2 could be prevented from cohering in the liquid crystal and could be uniformly and stably dispersed in the liquid crystal, were dispersed in chloroform or acetone which could well dissolve the liquid crystal and were then mixed together with this solvent into the liquid crystal and then this solvent was volatilized and removed to obtain a liquid crystal material 1 (of any nematic liquid crystal of a dielectric anisotropy of $\Delta\epsilon > 0$) in which the magnetic substance particles 2 were uniformly and stably mixed.

EXAMPLE 2

3 g. of a metal powder (of an average particle size of 0.2μ) were mixed into a methanol solution in which 2 parts by weight of the above-mentioned DMOAP had been mixed and were crushed with a ball mill for 5 days, then the methanol was volatilized and removed, the powder was fired at 120° C. for 20 minutes, was washed three times with acetone and was then dispersed with ultrasonic waves to obtain a metal powder colloidally dispersed in acetone. This colloidal solution was centrifuged (at 4000 rpm. for 20 minutes), a P-type nematic liquid crystal was mixed in its supernatant liquid and the acetone was volatilized and removed in a vacuum to obtain a liquid crystal in which the metal was mixed. When this was subjected to an ultrasonic dispersing treatment for 30 minutes, there was obtained a liquid crystal in which the metal was uniformly dispersed.

Here, the operation of the liquid crystal material obtained by the above-mentioned example as used as a liquid crystal display cell shall be explained with reference to FIGS. 2A to 4.

Figure 2A:
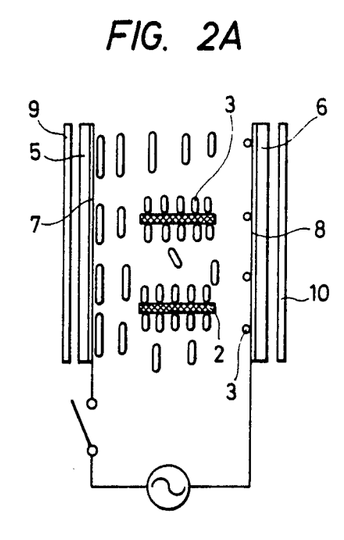
FIGS. 2A and 2B are explanatory views showing a liquid crystal cell using the liquid crystal material shown in FIG. 1 when no voltage is applied.
Figure 2B:
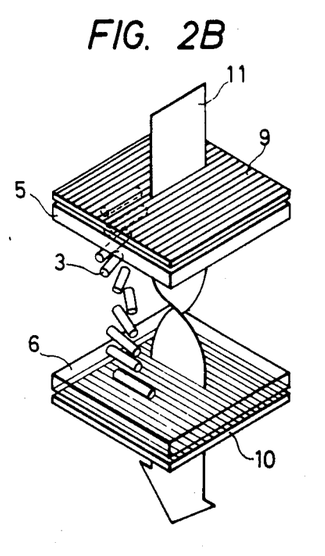

In FIGS. 2A and 2B, the reference numerals 5 and 6 represent transparent plates respectively coated with transparent electrodes 7 and 8 on the inner surfaces and rubbed so that liquid crystal molecules 3 may be oriented to be vertical to each other. The reference numerals 9 and 10 represent polarizing plates respectively provided outside the above-mentioned transparent plates 5 and 6 so that the polarizing directions may be vertical to each other. A light 11 can permeate as shown in FIG. 2B when there is no electric field but can not permeate when a voltage is applied. These relations will be reversed if the polarizing directions of the polarizing plates 9 and 10 are made parallel, the same as in the conventional liquid crystal display device.

Figure 3A:
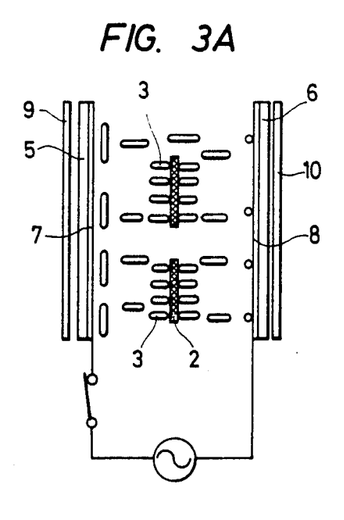
FIGS. 3A and 3B are explanatory views showing the liquid crystal cell shown in FIGS. 2A and 2B when a voltage is applied.
Figure 3B:
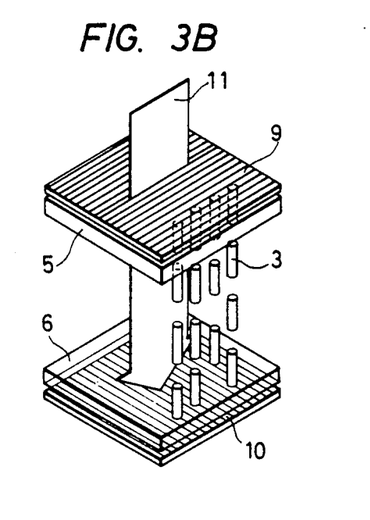
Figure 4:
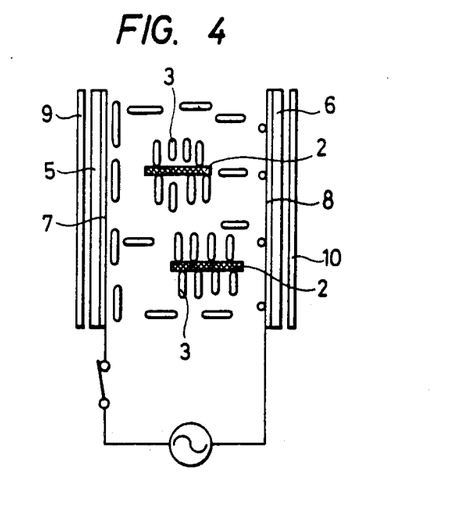
FIG. 4 is an explanatory view showing the liquid crystal cell shown in FIG. 3A when a permanent magnet is brought adjacently to it.

The magnetic substance particles 3 (of a length of about 0.5μ) will be oriented substantially vertically to the surfaces of the electrodes 7 and 8 along the twistedly oriented liquid crystal molecules 3 (of a length of about 50 Å) when there is no electric field as shown in FIG. 2B but will be oriented substantially parallelly by the vertically oriented liquid crystal molecules 3 when a voltage is applied as shown in FIGS. 3A and 3B. If a permanent magnet is brought to be adjacent while the voltage is thus applied, by its magnetic force, as shown in FIG. 4, the magnetic substance particles 2 will be oriented to be vertical to the surfaces of the electrodes 7 and 8, thereby the liquid crystal molecules 3 deposited on the surfaces of the electrodes 7 and 8 will become partly parallel and the electric capacity between the electrodes 7 and 8 will vary so as to be able to be made an input information signal.

EXAMPLE 3

Figure 5A:
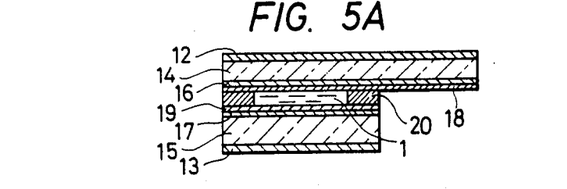
FIGS. 5A and 5B are respectively a sectional view and plan view of a test liquid crystal cell using the liquid crystal material shown in FIG. 1.
Figure 5B:
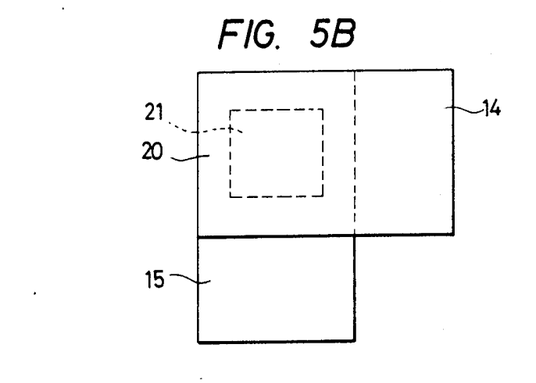

Metal particles (Fe particles of 0.2μ and an aspect ratio of 10:1) as a fine powder of a magnetic substance were treated on the surfaces with dimethyloctadecylaminopropyltrimethoxyl chloride (DMOAP) and were doped in a P-type nematic liquid crystal to make a liquid crystal material including fine particles of a magnetic substance. A test liquid crystal cell (a twisted nematic (TN) liquid crystal cell rubbed with polyvinyl alcohol (PVA)) shown in FIGS. 5a and 5B was charged with this liquid crystal material. In the drawings, the reference numerals 12 and 13 represent polaroid (Trade Mark) films, 14 and 15 represent transparent substrate, 16 and 17 represent indium tin oxide (ITO) electrodes, 18 and 19 represent orienting layers and 20 represents a spacer. The size of a dot 21 of the liquid crystal according to the present invention is $10 \times 10$ mm. and the cell thickness is about $20\mu$. A permanent magnet was brought to be adjacent and vertical to the surface of the film 12 or 13 and the variation of the capacitance of the liquid crystal material 1 was measured with an LCR meter. The test results are shown in Table 1.

TABLE 1

|  | Applied voltage | Capacitance variation | |
|---|---|---|---|
|  |  | In no magnetic field | In a magnetic field |
| Metal doped liquid crystal material according to the present invention | 1 KHz 0.04 V | 360 PF | 360 PF |
|  | 1 KHz 2 V | 720 PF | 650 PF |
| Conventional example | 1 KHz 2 V | 713 PF | 713 PF |

PVA rubbing
TN cell
Applied Magnetic field: Several ten Gausses

As evident from the above-mentioned Table 1, it has been confirmed that the liquid crystal cell charged with the liquid crystal material 1 doped with the fine powder 2 of a magnetic substance according to the present invention can easily cause the variation of the capacitance in a very weak magnetic field (of several ten Gausses) and can provide a liquid crystal switch having an effective switching function.

EXAMPLE 4

The liquid crystal material obtained in Example 1 was enclosed in microcapsules of a size of about several $\mu$ to $20\mu$ and the thus obtained microcapsules were combined to be a liquid crystal material. These microcapsules were arranged between a pair of transparent electrodes and a polarizing plate by painting or the like.

Figure 6A:
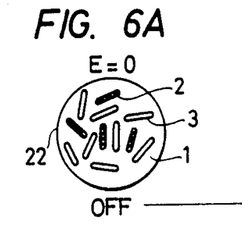
FIGS. 6A to 6C are views for explaining the operating principle of the liquid crystal material when an electric field is not applied (FIG. 6A), a magnetic field is applied (FIG. 6B) and then further an electric field is applied (FIG. 6C) to the encapsulated liquid crystal material shown in FIG. 1.
Figure 6B:
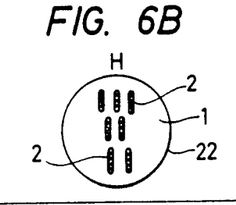
Figure 6C:
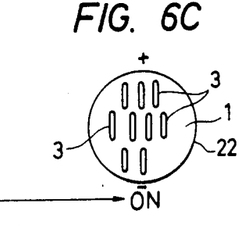
Figure 7A:
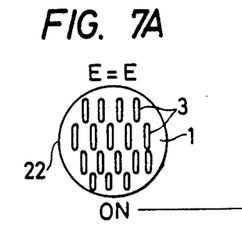
FIGS. 7A to 7C are views for explaining the operating principle of the liquid crystal material when an electric field is applied (FIG. 7A) a magnetic field is applied (FIG. 7B) and then further the above-mentioned magnetic field is removed in the above-mentioned liquid crystal material.
Figure 7B:
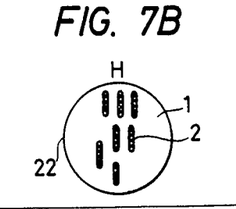
Figure 7C:
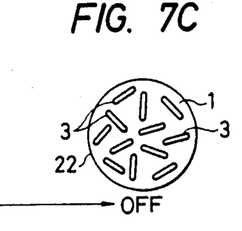

As shown in FIG. 6A, when the electric field $E=0$, the magnetic substance particles 2 and liquid crystal molecules 3 will be present at random within the capsule 22. When a magnetic field is applied in this state, as shown in FIG. 6B, the magnetic substance particles will be arranged in the magnetic field direction. At this time, the orientation of the liquid crystal molecules 3 will vary with the magnetic substance particles and therefore the capacitance will vary. If this capacitance variation is taken as a signal and the electric field E is applied to the liquid crystal molecules 3, the liquid crystal molecules 3 will be oriented in the direction of the electric field E, will therefore vary as in FIG. 6C, will be able to be optically taken as a reverse display and will be able to be applied to a pattern display sensing a magnetism. If the electric field E is applied at first as shown in FIG. 7A, the liquid crystal molecules 3 will be oriented, if a magnetic field 11 is applied in this state, as in FIG. 7B, the magnetic substance particles 2 will be oriented in the magnetic field direction and, if the electric field E is made zero by the capacitance variation, the liquid crystal molecules 3 will be at random as in FIG. 7C, will be able to be taken optically as a reverse display and will be able to be used in the same manner as a pattern display sensing a magnetism.

EXAMPLE 5

Figure 8:
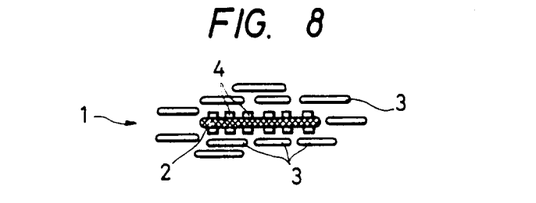
FIG. 8 is an explanatory view showing the formation of another embodiment of the liquid crystal material according to the present invention.
Figure 9A:
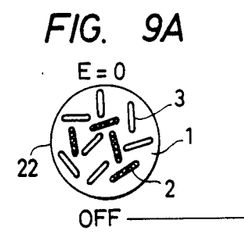
FIGS. 9A to 9C are views for explaining the operating principle of the liquid crystal material when an electric field is not applied (FIG. 9A), a magnetic field is applied (FIG. 9B) and then further an electric field is applied (FIG. 9C) to the encapsulated liquid crystal material shown in FIG. 8.
Figure 9B:
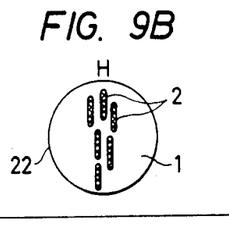
Figure 9C:
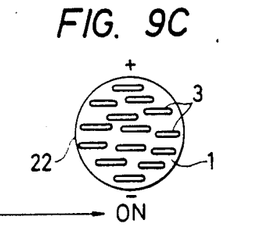
Figure 10A:
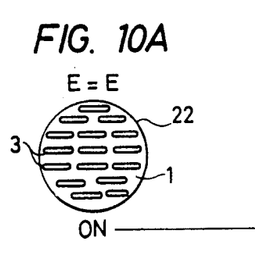
FIGS. 10A to 10C are views for explaining the operating principle of the liquid crystal material when an electric field is applied (FIG. 10A), a magnetic field is applied (FIG. 10B) and then further the above-mentioned magnetic field is removed (FIG. 10C) in the encapsulated liquid crystal material shown in FIG. 8.
Figure 10B:
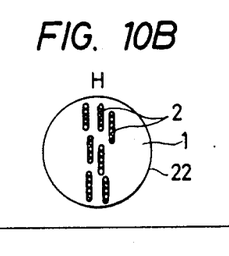
Figure 10C:
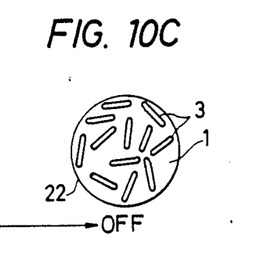

FIG. 8 is an explanatory view showing the relation between the magnetic substance particles 2 and liquid crystal molecules 3 in case a horizontally orienting agent is used for the surface active agent. The liquid crystal molecules 3 are of a nematic type liquid crystal (of $\Delta\epsilon < O$) orienting vertically to the electric field when a voltage is applied. FIGS. 9A to 10C are operating principle views in case the initial electric field E and magnetic field II are applied under the same conditions as in FIGS. 6A to 7C. In either case, the molecules 3 can be optically reversely displayed and can be applied to a pattern display sensing a magnetism.

EXAMPLE 6

Figure 11A:
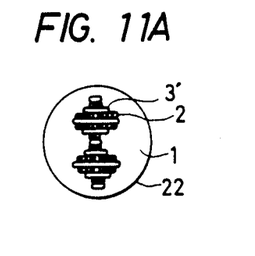
FIGS. 11A and 11B are views for explaining the operating principle of another further embodiment of the liquid crystal material according to the present invention in case a magnetic field is applied to it.
Figure 11B:
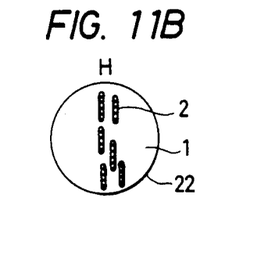

FIGS. 11A and 11B are operating principle explaining views in case a magnetic field is applied to cholesteric type liquid crystal molecules 3' in which a magnetic powder 2 coated with a surface active agent is dispersed.

In the normal state, the liquid crystal molecules 3' are spirally oriented as shown in FIG. 11A but, when a magnetic field H is applied to them, the magnetic powder 2 will be oriented in the magnetic field direction as in FIG. 11B and will then develop a color. This color development is taken as a display variation and can be applied to a pattern display detecting magnetism.

As in the above, in Examples 4 to 6, the liquid crystal) material 1 prepared by dispersing the needles shaped magnetic substance particles coated with the surface active agent 4 among the liquid crystal molecules 3 and 3' is enclosed in the microcapsules 22 and can be applied to a touch-entry panel or the like used as such input device as of a display cell or computer. In such case, a nematic or cholesteric type liquid crystal low in the viscosity is used for the liquid crystal molecules 3 and 3'. Needle-shaped magnetic substance particles made of $Fe_2O_3$, for example, of an aspect ratio of about 1:7 and a length less than $0.1\mu$ are used for the dispersed magnetic substance particles 2. For the coating surface active agent 4, there is used, for example, octadecyltriethoxysilane in the case of a vertical orientation agent (FIG. 1) or N-methylaminopropyltrimethoxysilane in the case of a horizontal orientation agent (FIG. 8). The microcapsules 22 are formed, for example, as mentioned above, by dispersing the liquid crystal material 1 in which the needle-shaped magnetic substance particles 2 coated with the surface active agent 4 are dispersed in a polymer emulsion consisting of an aqueous or organic solvent and then volatilizing and removing the above-mentioned solvent and the like. Therefore, the magnetic powder impregnated liquid crystal enclosed in the form of capsules with the polymer is in a viscous state, can be applied to paint any required part or shape and can be used in any form. Also, the painted part or the like has the microcapsules combined with each other by the polymer, is therefore soft and can be curved as required. Further, the above-mentioned liquid crystal material 1 may be used as a liquid crystal by respectively forming separate microcapsules 22 in advance and then combining them through a transparent binder or the like so as to be integral. Also, a gest-host type liquid crystal material can be made by mixing in a dye.

If the liquid crystal material 1 enclosed in the microcapsules 22 as mentioned above is used, as explained with reference to FIGS. 6A to 11B, when a magnetic field is applied, the orientation of the liquid crystal molecules will vary. Therefore, if the volume variation at that time is taken out as a signal and the state of the electric field is reversed by the signal, when the reversed part is made to have a displaying function in advance, the liquid crystal material 1 will be able to be applied to any displaying device.

Figure 12:
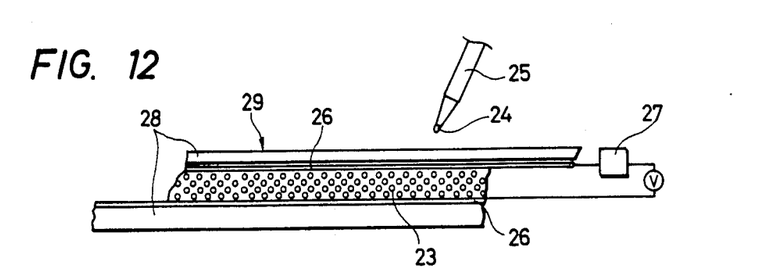
FIGS. 12 to 14 are views showing respectively application examples of the liquid crystal device using the liquid crystal material according to the present invention.

FIG. 12 is an explanatory view showing its application example. When the magnetic field sensitive microcapsule liquid crystal layer 23 according to the present invention is touched in any required part with a magnetic pen 25 having a permanent magnet 24, the magnetic powder of the liquid crystal layer 23 in that part will be arranged, the orientation of the liquid crystal molecules will vary with it and therefore the electrostatic capacity of that part will vary, for example, by 20 to 30%. If the capacity variation of any part is detected in advance and an operating circuit 27 is made to be operated by that signal to reverse the current passing state of a transparent electrode 26 in that part, the orientation state of the liquid crystal of that part will vary and a displaying function will be developed. By the way, in the drawing, the reference numeral 28 represents an illumination protecting layer.

Further, as liquid crystal materials of the present invention, there can be applied not only nematic type and cholestric type liquid crystals but also a strongly dielectric liquid crystal and smectic type liquid crystal.

Further, the above described needle-shaped magnetic substance can be made by enclosing in advance a magnetic substance of very fine particles with a polymer film so as to be microcapsules and these microcapsules can be coated with a surface active agent so as to be the same liquid crystal material as is described above. This liquid crystal material can be further made microcapsules and handled the same as is mentioned above.

Figure 13:
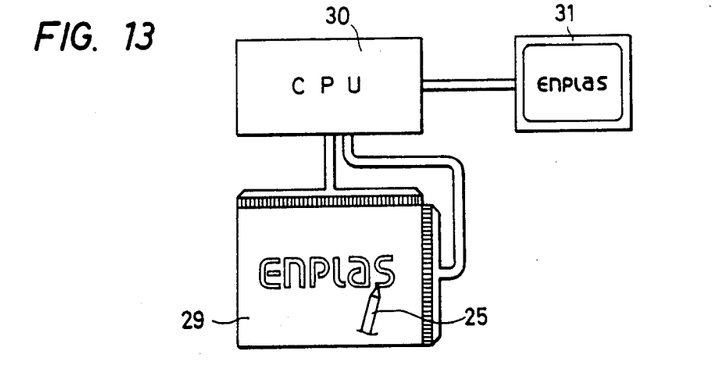

If such touch-entry panel 29 is used as an input terminal device of a computer, thereby, for example, words and devices will be able to be displayed on the display surface of a CRT. That is to say, if the transparent panel 26 is formed to be in the form of an X-Y matrix and, for example, as shown in FIG. 13, this touch-entry panel 29 is connected to a computer device consisting of a CPU 30 and CRT 31, a display can be made in the position on the display surface of the CRT 31 corresponding to any desired X-Y position on the touch-entry panel 29, therefore a device put into the touch-entry panel 29 with the magnetic pen 29 can be displayed on the display surface of the CRT 31. Also, a word or the like hand-written with the magnetic pen 25 on the touch-entry panel 29 can be recognized by the CPU 30 of the computer device and can be displayed on the display surface of the CRT 31 as memorized in a dot pattern in advance. Further, if the touch-entry panel is formed of a transparent body, it can be arranged on the display surface of the CRT so that the touch-entry can be made while seeing the display surface.

Figure 14:
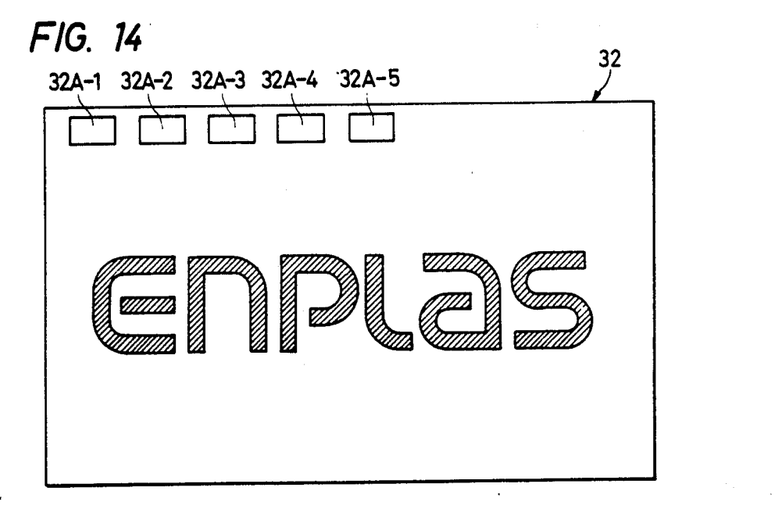

FIG. 14 is an explanatory view showing another application example. According to this application example, a plurality of touch-entry sections 32A-1, 32A-2, 32A-3, . . . are provided in a part of the display region of a liquid crystal display cell 32 so that, when a magnetic pen is brought adjacently to any one of these sections, information designated by that section may be displayed on the display surface.

As described above, according to the present invention, a switching function by a magnetic field can be easily applied to any liquid crystal display device utilizing the conventional photoelectric effect. For example, the present invention can be utilized as a new input device for a computer instead of the conventional keyboard. Further, according to the present invention, a liquid crystal material is formed as a group of microcapsules combined with one another and therefore, in the case of forming a cell, the structure can be simplified and a curved cell can be also easily made.

As evident from the above explanation, an integrated liquid crystal panel having a built-in direct touch entry enabling device high in the durability and reliability can be provided at a low cost by utilizing the liquid crystal material according to the present invention.

What is claimed is:

1. A liquid crystal material comprising a liquid crystal substance to be used to form a liquid crystal display device and many needle-shaped magnetic substance particles dispersed in said liquid crystal substance and coated respectively with a surface active agent.

2. An integrated liquid crystal panel having a built-in direct touch-entry enabling device including therein said liquid crystal material defined in claim 1.

3. A liquid crystal material consisting of many microcapsules combined with one another and respectively containing therein a liquid crystal substance to be used to form a liquid crystal display device and many needle-shaped magnetic substance particles dispersed in said liquid crystal substance and coated respectively with a surface active agent.

4. An integrated liquid crystal panel having a built-in direct touch-entry enabling device including therein said liquid crystal material defined in claim 3.

5. A liquid crystal material according to claim 1 or 3 wherein said surface active agent is used to orient the molecules of said liquid crystal substance so that their long axes may be vertical to the surfaces of said magnetic substance particles, to prevent said magnetic substance particles from cohering and to uniformly and stably disperse said magnetic substance particles in said liquid crystal substance.

6. A liquid crystal material according to claim 1 or 3 wherein said surface active agent is used to orient the molecules of said liquid crystalk substance so that their long axes may be parallel with the surface of said magnetic substance particles, to prevent said magnetic substance particles from cohering and to uniformly and stably disperse said magnetic substance particles in said liquid crystal substance.

7. A liquid crystal material according to claim 1 or 3 wherein said magnetic substance particles consist of either of ferrite or metal and have a length of 0.2 to 0.5µ.

8. A method of producing a liquid crystal material comprising a first step of preparing many needle-shaped magnetic substance particles, a second step of treating said respective magnetic substance particles on the surfaces with a surface active agent to orient the molecules of a liquid crystal substance so that their long axes may be vertical to the surfaces of said magnetic substance crystals, to prevent said magnetic substance particles from cohering and to uniformly and stably disperse said magnetic substance particles in the liquid crystal substance to be used to form a liquid crystal display device, a third step of dispersing many needle-shaped magnetic substance particles obtained by said second step in a solvent affinable with said liquid crystal substance, a fourth step of mixing the resulant obtained by the third step into said liquid crystal substance and a fifth step of volatilizing and removing said solvent from the mixture obtained by the fourth step to uniformly and stably mix and retain said magnetic substance particles in said liquid crystal substance.

9. A method of producing a liquid crystal material according to claim 8 further comprising a sixth step of encapsulating the mixture obtained by the fifth step.

10. A method of producing a liquid crystal material according to claim 8 or 9 wherein said magnetic substance particles consist of either of ferrite or metal and have a length of 0.2 to 0.5$\mu$.

11. A method of producing a liquid crystal material according to claim 8 or 9 wherein said surface active agent is any one of a monobasic carboxylic acid polynucleic chromium complex, dimethyloctadecylaminopropyltrimethoxyl chloride and organic silane compound.

12. A method of producing a liquid crystal material according to claim 8 or 9 wherein said solvent is any one of toluene, xylene, acetone and chloroform.

* * * * *